United States Patent
Schmidl et al.

(10) Patent No.: US 6,801,567 B1
(45) Date of Patent: Oct. 5, 2004

(54) FREQUENCY BIN METHOD OF INITIAL CARRIER FREQUENCY ACQUISITION

(75) Inventors: Timothy M. Schmidl, Dallas, TX (US); Sundararajan Sriram, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/539,040

(22) Filed: Mar. 30, 2000

(51) Int. Cl.[7] .............................................. H04B 1/707
(52) U.S. Cl. .................................... 375/149; 375/150
(58) Field of Search .............................. 375/147, 145, 375/350, 503, 149, 150, 342, 330, 340; 455/436, 510; 370/529, 333, 337; 714/755

(56) References Cited

U.S. PATENT DOCUMENTS

| | | | | |
|---|---|---|---|---|
| 6,111,911 A | * | 8/2000 | Sanderford et al. | 375/147 |
| 6,185,244 B1 | * | 2/2001 | Nystrom et al. | 375/145 |
| 6,480,558 B1 | * | 11/2002 | Ottosson et al. | 375/350 |
| 6,597,729 B1 | * | 7/2003 | Schmidl et al. | 375/149 |
| 6,597,911 B1 | * | 7/2003 | Kransmo | 455/436 |

* cited by examiner

Primary Examiner—Stephen Chin
Assistant Examiner—Ted Wang
(74) Attorney, Agent, or Firm—Ronald O. Neerings; Wade James Brady, III; Frederick J. Telecky, Jr.

(57) ABSTRACT

A frequency bin method of carrier frequency acquisition uses a plurality of predetermined carrier frequency offset bins. A single bin is selected from among the plurality of bins. A local VCO is then adjusted to remove the carrier frequency offset associated with the single selected bin. Carrier frequency acquisition is then attempted using the adjusted VCO. If successful, the receiver enters its steady state operating mode. If unsuccessful, a new bin is selected and the VCO is again adjusted using the new carrier frequency offset associated with the newly selected bin. The process is repeated until successful communication is achieved in association with a properly adjusted VCO.

24 Claims, 4 Drawing Sheets

FREQUENCY BIN METHOD OF INITIAL CARRIER FREQUENCY ACQUISITION

RELATED PATENT APPLICATIONS

This application is related to and claims the benefit of co-pending U.S. Patent Application entitled A Joint Position and Carrier Frequency Estimation Method of Initial Frequency Acquisition for a WCDMA Mobile Terminal, docket no. TI-29531, filed on Mar. 24, 2000, now U.S. Pat. No. 6,597,729, by Timothy M. Schmidl and Sundararajan Sriram.

BACKGROUND OF THE INVENTION

1. Field of the Invention

This invention relates generally to wideband code division multiple access (WCDMA) for a communication system and more particularly to a frequency bin method of carrier frequency acquisition following turn-on for a mobile terminal or remote receiver in a WCDMA system.

2. Description of the Prior Art

Wireless networks are becoming increasingly popular, and in this regard there have been improvements in many aspects of such networks. Some of these improvements relate to carrier frequency acquisition techniques. F. Classen and H. Meyr, Maximum Likelihood Open Loop Carrier Synchronizer For Digital Radio, IEEE International Conference on Communications (ICC), vol. 1, pp. 493–497 (1993), for example, disclose one method of frequency acquisition implemented for small carrier frequency offsets in which phase differences between consecutive symbols are computed. Classen et al. show that a small carrier frequency offset can be estimated by:

$$2\pi \Delta \hat{f} P = \text{angle}\left(\sum_n \frac{a_{n+1}^*}{a_n^*} z_n^* z_{n+1}\right); \quad \text{wherein}$$

$z_n$ denotes received symbols, $a_n$ denotes the data modulating these symbols, P denotes the symbol period and $\hat{f}$ is an estimate of the carrier frequency offset.

The initial carrier frequency offset seen by a mobile terminal or remote receiver following power-on, can however, be as much as 10 ppm, which is 20 kHz at a carrier frequency of 2 GHz. This large carrier frequency offset is unavoidable where inexpensive oscillators without temperature compensation must be used in order to compete in the wireless network market place. Oscillators having better frequency stability require temperature compensation capability and are prohibitively expensive. In view of the foregoing, there will be as much as a 10 ppm error in the sampling clock at a mobile terminal where the carrier frequency clock and the sampling rate clock are locked together in order to correct the sampling rate offset. A sampling rate of 3.84 MHz will thus see an error as large as 38.4 chips per second. Therefore, the sampling rate will automatically be corrected when the carrier frequency offset is corrected.

The foregoing large errors in the carrier frequency and sampling rate make initial frequency acquisition difficult. The primary synchronization channel associated with WCDMA communication has symbols that are 256 chips (66.7 μsec) long. Further, a carrier frequency offset of 20 kHz for a 2 GHz carrier frequency causes a phase rotation of 480 degrees from the beginning to the end of the primary synchronization channel symbol. A coherent summing of all 256 chips should not therefore be performed with such a large carrier frequency offset. A sampling rate offset of 38.4 chips per second, for example, causes the sampling position to change by 0.384 chips in 10 msec. Thus, some form of drift compensation would have to be employed to track the correct sampling position if the same sampling position is used for more than 10 msec.

In view of the foregoing, a cost competitive and efficient technique for achieving initial frequency acquisition following power-on for a mobile terminal or remote receiver associated with WCDMA communications is both desirable and necessary to advance the art related to wireless networks.

SUMMARY OF THE INVENTION

The present invention is directed to a method of determining a carrier frequency offset immediately following power-up of a mobile terminal or remote receiver during WCDMA mode communication between a base station and the mobile terminal or remote receiver such that the initial carrier frequency can be acquired by the mobile terminal/remote receiver prior to initiating communication. One method first divides the primary synchronization channel into: parts, i.e. 4 parts, since the primary synchronization channel cannot be summed coherently over its full length with a frequency offset as high 20 kHz, thereby providing a desired pull-in range for a frequency estimator according to one embodiment of the present invention. In this embodiment, let the correlation outputs with each of the 4 parts of the primary synchronization channel (each with 64 chips) at position k and time slot m be represented by $S_{1,k,m}$, $S_{2,k,m}$, $S_{3,k,m}$, and $S_{4,k,m}$. The phase difference $\Delta\phi$ between each segment can then be calculated and used to estimate the carrier frequency offset.

$$\Delta \hat{f} = \Delta \hat{\phi} \frac{1}{2\pi T} \quad (1)$$

The symbol T denotes the length of a single segment and 1/(2T) is assumed to be 30,000 for one embodiment described herein. The estimate of the phase difference calculated from the primary synchronization channels at position k in one frame is:

$$\Delta \hat{\phi} = \text{angle}\left(\sum_{m=1}^{15} s_{1,k,m}^* s_{2,k,m} + s_{2,k,m}^* s_{3,k,m} + s_{3,k,m}^* s_{4,k,m}\right) \quad (2)$$

The position p of the path with the largest magnitude is first estimated by finding $$p = \arg\max_k \left(\left|\sum_{m=1}^{15} s_{1,k,m}^* s_{2,k,m} + s_{2,k,m}^* s_{3,k,m} + s_{3,k,m}^* s_{4,k,m}\right|^2\right) \quad (3)$$

The position p of the path with the largest magnitude determined from equation (3) is then used to estimate the phase difference given by equation (2). This phase difference determined by equation (2) is then used in equation (1) to estimate the carrier frequency offset. Finally, the acquisition time is determined by the probability that the path at position p really exists and by the standard deviation of the frequency estimate when the path does exist.

Initial carrier frequency acquisition can also be achieved using a frequency bin method by first correcting the carrier frequency offset to within 2 ppm. This technique is useful where absolutely no additional increase in hardware can be tolerated. The frequency range of interest is first divided into a number of bins, preferably 5 bins, e.g. −16, −8, 0, 8 and 16 kHz, which corresponds to −8, −4, 0, 4 and 8 ppm respectively for a frequency range between −20 kHz and +20 kHz. Frequency acquisition is performed by first assuming the carrier frequency offset is 0 Hz and performing the steady state acquisition. If the carrier frequency offset is outside the range of −4 to 4 kHz, then the acquisition will likely fail, and another bin will be tried. The mobile terminal preferably stores carrier frequency offset information from just before it was previously powered-off. During power-on, the mobile terminal can then start the search in the bin corresponding to the one stored in memory. If the temperature of the mobile terminal or receiver has not changed much when it is turned-on again, then it is likely that the frequency bin has not changed and carrier frequency acquisition can be achieved in the same period of time as is needed under steady state conditions.

Accordingly, a WCDMA communication signal is first downconverted and sampled at the remote receiver or mobile terminal. Frequency acquisition is then implemented in 3 stages. In stage 1 of carrier frequency acquisition, the primary synchronization code is first located. During stage 2 of acquisition, the secondary synchronization code that overlaps the primary synchronization channel containing the primary synchronization channel symbols is decoded. This secondary synchronization code indicates the code group used by the cell. In stage 3 of acquisition, the particular scrambling code used by the base station or transmitter of interest is determined by searching through the scrambling codes in the code group. If the correct scrambling code has been determined, the remote receiver can enter its steady state operating mode wherein communication between the base station and the mobile terminal or remote receiver takes place. If communication between the base station/transmitter and the mobile terminal/remote receiver cannot be achieved within a predetermined period of time, another bin is chosen and the foregoing process repeated. Similarly, the local VCO is necessarily adjusted to remove the frequency offset associated with the frequency bin being utilized before implementing stages 1–3 of the carrier frequency acquisition process each time the carrier frequency acquisition process is required to execute stages 1–3. This process will then continue until the local VCO frequency is correctly adjusted to account for the correct carrier frequency offset thereby allowing the mobile terminal/remote receiver to enter its steady state operating mode.

As used herein, the following words have the following meanings. The words "algorithmic software" means an algorithmic program used to direct the processing of data by a computer or data processing device. The words "data processing device" as used herein refer to a CPU, DSP, microprocessor, micro-controller, or other like device and an interface system. The interface system provides access to the data processing device such that data could be entered and processed by the data processing device. The words "discrete data" as used herein are interchangeable with "digitized data" and "digitized data" as used herein means data which are stored in the form of singularly isolated, discontinuous data or digits.

In one aspect of the present invention, a method of achieving initial carrier frequency acquisition for a mobile terminal/remote receiver in a WCDMA system accommodates frequency offsets up to about 10 ppm.

In another aspect of the present invention, a method of achieving initial carrier frequency acquisition for a mobile terminal/remote receiver in a WCDMA system accommodates frequency offsets up to about 10 ppm with no additional hardware requirements.

In still another aspect of the present invention, a method of achieving initial carrier frequency acquisition for a mobile terminal/remote receiver in a WCDMA system accommodates frequency offsets up to about 10 ppm with substantially no user noticeable operational characteristics.

In yet another aspect of the present invention, a method of achieving initial carrier frequency acquisition for a mobile terminal/receiver in a WCDMA system without requiring use of a temperature compensated oscillator at the mobile terminal/remote receiver.

Still another aspect of the present invention is associated with achieving initial carrier frequency acquisition for a mobile terminal/remote receiver in a WCDMA system that is easy to accomplish and cost competitive in the wireless network product marketplace, even when the carrier frequency offset between a base station or transmitter and the mobile terminal or remote receiver is as large as about 10 ppm.

Yet another aspect of the present invention is associated with achieving initial carrier frequency acquisition for a mobile terminal or remote receiver in a WCDMA communication system without use of multiple metrics such that memory usage efficiency is optimized.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings in which like reference numerals designate like parts throughout the figures thereof and wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
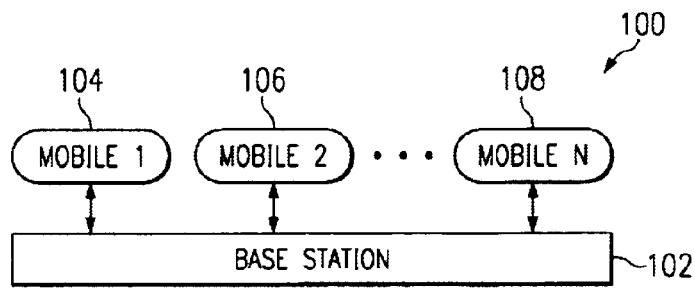
FIG. 1 is a block diagram of a typical cell within a wideband code division multiple access (WCDMA) system showing a single base station/transmitter in communication with a plurality of mobile terminals/remote receivers.

FIG. 1 is a block diagram of a typical cell 100 within a wideband code division multiple access (WCDMA) system showing a single base station or transmitter 102 in communication with a plurality of mobile terminals or remote receivers 104, 106, 108. Following power-on for any particular mobile terminal/remote receiver 104–108, the carrier frequency offset between the mobile terminal/remote receiver 104–108 and the base station/transmitter 102 can be as much as 10 ppm, which is 20 kHz at a carrier frequency of 2 GHz, when the mobile terminal/transmitter 104–108 does not incorporate a temperature compensated oscillator. Since use of temperature compensated oscillators is cost prohibitive for the present wireless communication products market, it is desirable to provide a technique for achieving initial carrier frequency acquisition at a mobile terminal/remote receiver 104–108 without use of such temperature compensated oscillators or otherwise necessitating additional hardware requirements. The clocks for the carrier frequency and the sampling rate are generally locked together at each mobile terminal/remote receiver 104–108, therefore also creating as much as a 10 ppm error in the mobile terminal/remote receiver sampling clock (not shown). A sampling rate error of 38.4 chips per second will result when the sampling rate is 3.84 MHz, for example, when the oscillator error is 10 ppm. Thus, when the carrier frequency offset is corrected, the sampling rate will also automatically be corrected.

Figure 2:
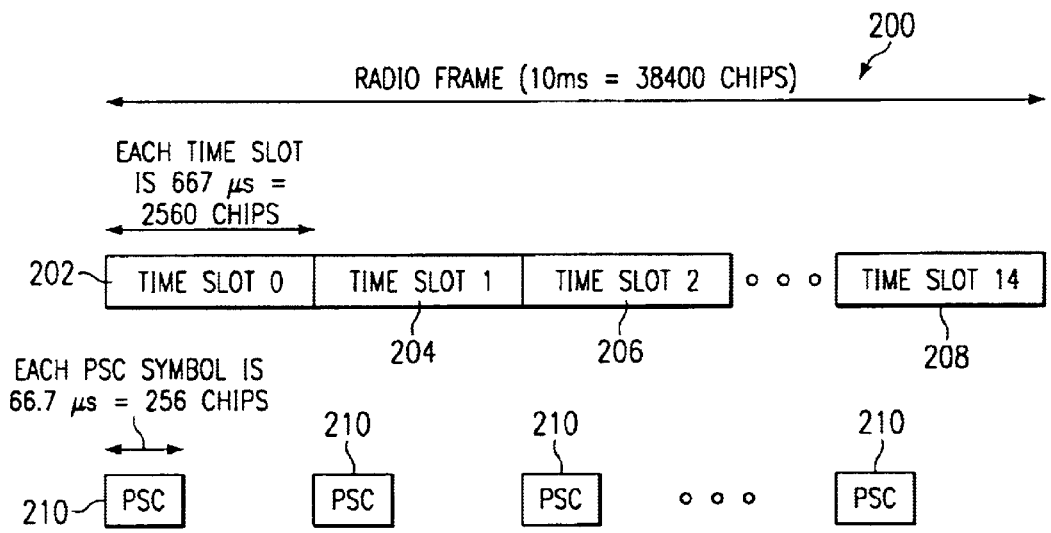
FIG. 2 is a diagram of a typical FDD/WCDMA radio frame that may be transmitted by the communication system of FIG. 1.

FIG. 2 is a diagram of a FDD/WCDMA radio frame 200 that may be transmitted by the communication system 100 of FIG. 1. The radio frame 200 can be seen to have a duration of 10 msec. The radio frame is divided into 15 equal time slots 202–208. Each of these time slots 202–208 is further divided into 2560 chip times Tc. A primary synchronization channel symbol 210 consisting of a modulated code of length 256 chips (66.7 μsec), is transmitted once every time slot 202–208 and is generally the same for all cells in a particular communication system.

Figure 3:
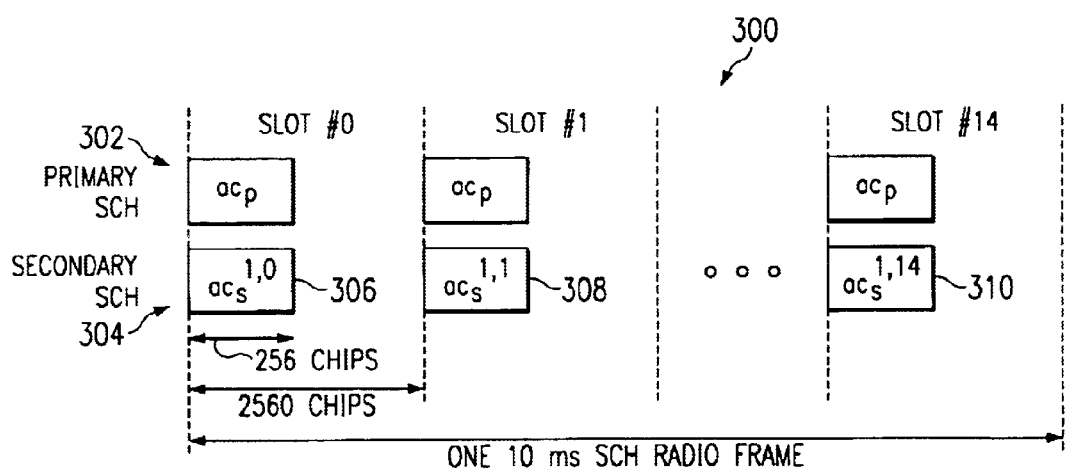
FIG. 3 illustrates the structure of a typical synchronization channel (SCH) including a primary and secondary synchronization channel associated with the WCDMA radio frame shown in FIG. 2.

FIG. 3 illustrates the structure of a typical synchronization channel 300 including a primary synchronization channel 302 and secondary synchronization channel 304 associated with the WCDMA radio frame 200 shown in FIG. 2. The primary synchronization channel 302, as stated above, consists of a modulated code of length 256 chips, that is transmitted once every time slot 202–208 and is denoted $C_p$ in FIG. 3. The secondary synchronization channel 304 consists of repeatedly transmitting a length 15 symbol sequence 306–310 of modulated codes of length 256 chips, transmitted in parallel with the primary synchronization channel 302 symbol 210 codes. The secondary synchronization channel 304 symbol sequence 306–310 is denoted $c_s^{i,k}$ in FIG. 3, where i=1,2, . . . ,64 is the number of the scrambling code group, and k=0,1, . . . ,14 is the slot number. Each secondary synchronization channel 304 symbol sequence 306–310 is chosen from a set of 15 different codes of length 256. This sequence 306–310 on the secondary synchronization channel 304 indicates which of the code groups the cell's downlink scrambling code belongs to.

Figure 4:
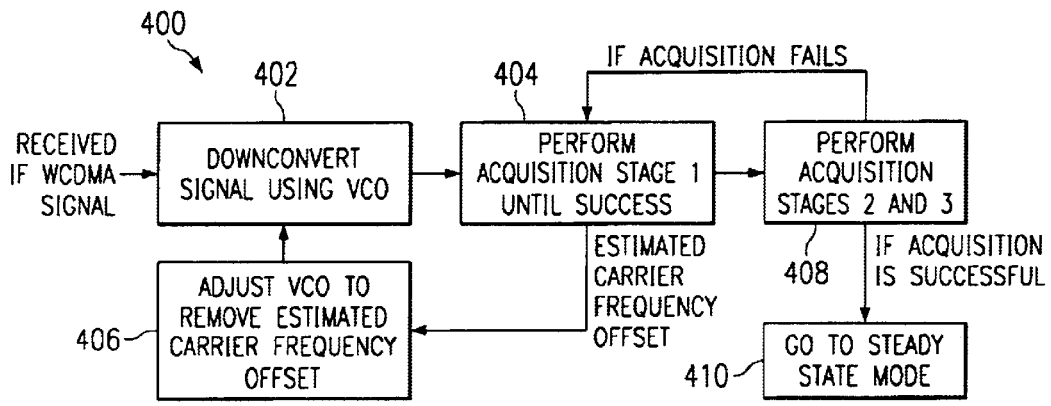
FIG. 4 is a block diagram illustrating one method of achieving initial carrier frequency acquisition for a mobile terminal or remote receiver in a WCDMA communication system such as shown in FIG. 1 according to one embodiment of the present invention.

FIG. 4 is a block diagram 400 illustrating a joint position and carrier frequency estimation method of achieving initial frequency acquisition for a mobile terminal or remote receiver in a WCDMA communication system such as shown in FIG. 1 according to one embodiment of the present invention. Since the primary synchronization channel 302 cannot be summed coherently over its full length with a frequency offset as high as 20 kHz, it can still be subdivided into parts, e.g. 2 or 4 parts, such that the base station/transmitter carrier frequency can be acquired by a mobile terminal/remote receiver following its initial power-up. If a primary synchronization channel 302 has symbols that are 256 chips (66.7 μsec) long, it can be divided into 2 parts, for example, such that the pull-in range of the frequency estimator will be +/−15 kHz. Using the 10 ppm initial carrier frequency offset described herein above, this is less than the required pull-in range of 20 kHz. Therefore, the primary synchronization channel 302 is more preferably divided into 4 parts such that the pull-in range is now +/−30 kHz, which is enough to acquire a carrier frequency having the above described 20 kHz carrier frequency offset.

Using the WCDMA time slots 306–310 depicted in FIG. 3, it is quickly realized that there are 5120 positions in the search window with half-chip resolution and 2560 chips per time slot. Storing 16 bits per position will therefore require 10240 bytes of memory. Since it is desired to minimize memory requirements associated with the present invention, multiple metrics per position necessarily must therefore be avoided. This requirement is accommodated by the present method wherein a joint position and carrier frequency estimation metric is analyzed to achieve initial frequency acquisition according to one embodiment of the present invention as described in further detail herein below.

The instant embodiment is clearly described first by letting the correlation outputs associated with each of the 4 parts (segments) of the primary synchronization channel 302 (each with 64 chips) at position k and time slot m be represented by $S_{1,k,m}$, $S_{2,k,m}$, $S_{3,k,m}$, and $S_{4,k,m}$. The phase difference $\Delta\phi$ between each segment can then be determined according to the present method and used to estimate the carrier frequency offset.

$$\Delta \hat{f} = \Delta \hat{\phi} \frac{1}{2\pi T} \quad (1)$$

The estimate of the phase difference calculated from the primary synchronization channels at position k in one frame is:

$$\Delta \hat{\phi} = \text{angle}\left(\sum_{m=1}^{15} s^*_{1,k,m} s_{2,k,m} + s^*_{2,k,m} s_{3,k,m} + s^*_{3,k,m} s_{4,k,m}\right) \quad (2)$$

The position p of the path with the largest magnitude is first estimated by finding $$p = \arg\max_{k}\left(\left|\sum_{m=1}^{15} s^*_{1,k,m}s_{2,k,m} + s^*_{2,k,m}s_{3,k,m} + s^*_{3,k,m}s_{4,k,m}\right|^2\right) \quad (3)$$

This position p estimated by equation (3) to have the largest magnitude will then provide the necessary and correct path data such that the phase difference Δφ between segments referenced above can be determined by using that path data in equation (2). The actual acquisition time according to one embodiment of the present method, will be determined by the probability that the path associated with the position p having the largest magnitude really does exist and further by the standard deviation of the frequency estimate when the path does in fact exist. These parameters are used to formulate a joint metric that can be used to accept or reject the carrier frequency offset determined by equation (1) above. When the joint metric falls within a predetermined window, the estimated carrier frequency offset is then used to acquire the respective carrier frequency and therefore correct any residual carrier frequency error offset within the mobile terminal/remote receiver.

With continued reference to FIG. 4, the foregoing principles of the present method are now described in further detail herein below. According to one embodiment, the present method begins following initial power-up of a mobile terminal/remote receiver. Following power-up, the mobile terminal or remote receiver first downconverts a WCDMA signal received from the base station or transmitter. This downconversion is depicted in block 402. Following the downconversion, the mobile terminal/remote receiver begins to acquire the base station/transmitter carrier signal by entering stage 1 of the present method as shown in block 404. During stage 1 of acquisition, the location of the primary synchronization code and the carrier frequency associated with the base station/transmitter are estimated by the mobile terminal/remote receiver using the principles set forth above with reference to equations (1)–(3). Subsequent to estimating the carrier frequency offset during stage 1 of the acquisition process, the carrier frequency at the mobile terminal/remote receiver is then corrected by adjusting the local VCO to remove the estimated carrier frequency offset such as illustrated at block 406. With the VCO now adjusted to the estimated carrier frequency, the mobile terminal/remote receiver next enters stages 2 and 3 of the present method as shown in block 408. In stage 2, the secondary synchronization code that overlaps the primary synchronization channel containing the primary synchronization symbols 210 is decoded so that the mobile terminal/remote receiver will know which group of downlink codes the base station/transmitter uses. In stage 3, the scrambling code being used by the particular base station/transmitter is then determined from the foregoing group of downlink codes by correlating the downlink codes with the pilot symbols transmitted by the base station/transmitter. If the correlation fails, the present frequency acquisition cannot take place and the present process must repeat stages 1–3 of initial frequency acquisition until the carrier frequency is successfully acquired. Upon successful frequency acquisition, the mobile terminal/remote receiver then begins communication with the base station/transmitter by entering into its steady state operating mode as depicted in block 410.

Figure 5:
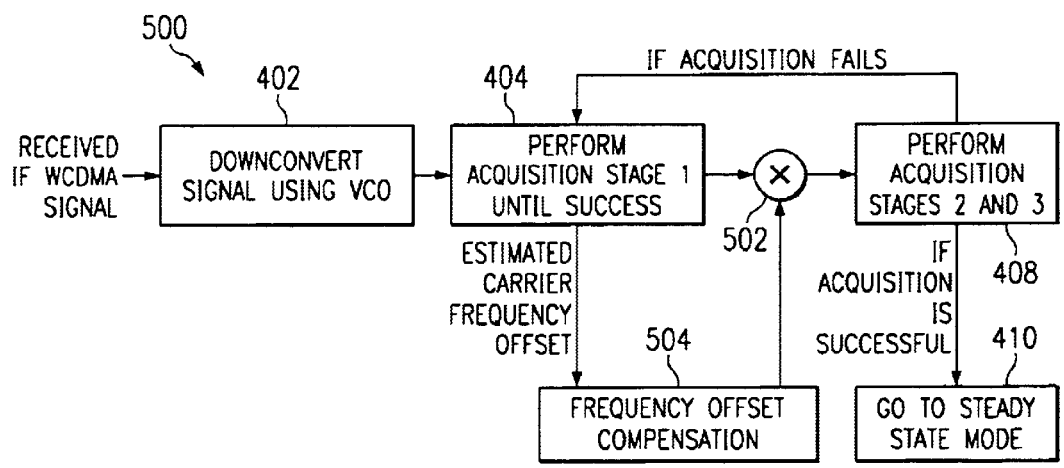
FIG. 5 is a block diagram illustrating another embodiment of the method depicted in FIG. 4 of achieving initial carrier frequency acquisition for a mobile terminal or remote receiver in a WCDMA communication system such as shown in FIG. 1.

FIG. 5 is a block diagram 500 illustrating another embodiment of the present joint position and carrier frequency estimation method of achieving initial carrier frequency acquisition for a mobile terminal/remote receiver in a WCDMA communication system such as shown in FIG. 1. The present method according to FIG. 5 is very similar to the method described above with reference to FIG. 4. The instant method however, implements carrier frequency adjustments at the mobile terminal/remote receiver using a completely different technique. The VCO is left unattended, and instead, frequency offset compensation is implemented by multiplying the sampled WCDMA signal by complex frequency correction factors as illustrated in blocks 502 and 504. Such multiplication of samples by complex frequency correction factors is a technique well known to those skilled in the art of signal processing and so further details of this portion of the present method will not be discussed herein to preserve clarity and brevity.

Figure 6:
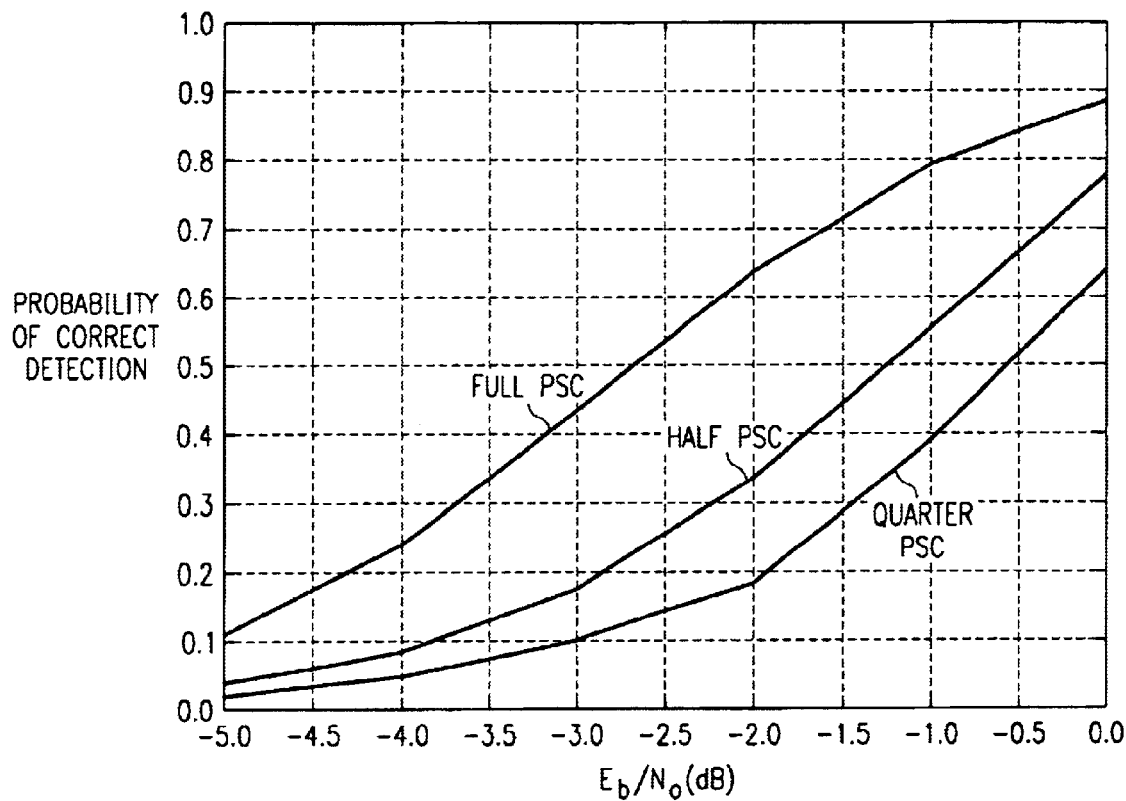
FIG. 6 is a graph illustrating simulated results showing the probability of correct detection of a single path in AWGN with no carrier frequency offset and with averaging over 16 time slots for $E_b/N_o$ values ranging from −5 to 0 dB according to one embodiment of the present invention.

FIG. 6 is a graph of simulated results illustrating the probability of correct detection of a single path in additive white Gaussian noise (AWGN) with no carrier frequency offset and with averaging over 15 time slots for $E_b/N_o$ values ranging from −5 to 0 dB when using the present method. All of the samples of the primary synchronization channel 302 are used in every case, and the coherent sum is taken over 256, 128 and 64 chips, respectively, for the full primary synchronization channel, half primary synchronization channel and quarter primary synchronization channel. In the instant simulation, the carrier frequency offset was set at 0 so that coherent averaging over the full primary synchronization channel could be performed. The simulation was performed with averaging over 16 time slots (10 msec). It is seen that the probability of acquisition with the quarter primary synchronization channel is about a factor of 4 smaller than that obtained with the full primary synchronization channel at an $E_b/N_o$ of −3 dB. This means that initial acquisition will take about 4 times as long as steady state acquisition using the full primary synchronization channel (with a small carrier frequency offset).

Application of the foregoing principles via an exemplary mobile terminal demonstrates the complexity of software and hardware modifications necessary to accommodate initial carrier frequency acquisition for a mobile terminal or remote receiver in a WCDMA communication system. Stage 1 (finding the location of the primary synchronization code) of the above referenced steady state acquisition, for example, will require 13 complex adds for the correlation with the primary synchronization channel and 2 real adds to accumulate the power at each position. The total number of real adds required is (28)(7.68e6)=215 million real adds per second. In contrast thereto, the joint position and frequency estimation method according to one embodiment requires 20 complex adds for the correlation with the primary synchronization channel and then 3 complex multiplies and 3 complex adds to sum up the phasors computed at each position. If the complex multiplies for the exemplary mobile terminal/remote receiver are done in hardware (i.e., not on the DSP), extra hardware must be added to the mobile terminal or remote receiver. If each complex multiply is equivalent to 8 complex adds, then the computational complexity for stage 1 of initial acquisition is (94)(7.68e6)=722 million real adds per second, which is an increase of over a factor of 3 in computational complexity over the steady state acquisition technique (using the full primary synchronization channel) for the exemplary mobile terminal/remote receiver.

Table 1 below presents the standard deviation of the carrier frequency offset estimate for different amounts of averaging. At an $E_b/N_o$ of −3 dB and with quarter symbol coherent averaging over 16 time slots, the standard deviation of the carrier frequency offset is 6600 Hz (3.32 ppm) with the AWGN channel. Therefore, if stages 2 and 3 of acquisition require a frequency accuracy of 2 ppm, then about 50% of the time the frequency will be outside this range, and the acquisition time will double to about 8 times the steady state acquisition time. Stage 2 of the joint position and carrier frequency estimation method of initial carrier frequency acquisition requires decoding the secondary synchronization code that overlaps the primary synchronization channel 302 that contains the primary synchronization symbols 210. After decoding the secondary synchronization symbols, the mobile terminal/remote receiver will know which group of downlink codes the base station or transmitter uses. Stage 3 of the present joint position and carrier frequency estimation method of initial carrier frequency acquisition is associated with determination of the particular scrambling code from the group determined in stage 2, that is being used by the particular base station/transmitter and can be implemented by correlation with the pilot symbols.

the joint position and carrier frequency estimation method will likely not achieve initial carrier frequency acquisition if either the position or carrier frequency information estimated during stage 1 is erroneous, this process is then repeated until initial frequency acquisition actually transpires. Finally, the mobile terminal or remote receiver will enter its steady state operating mode when it has successfully achieved the initial frequency acquisition following power-up.

Figure 7:
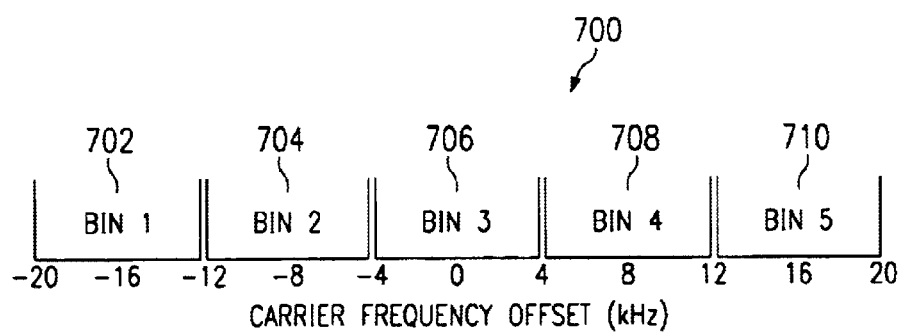
FIG. 7 is a diagram illustrating a family of frequency bins having predetermined carrier frequency offsets suitable for implementing the present frequency bin method of carrier frequency acquisition according to one embodiment of the present invention.

In view of the foregoing principles and discussion related to WCDMA signals and systems, the present frequency bin method of carrier frequency acquisition is now presented herein below with reference to FIGS. 7–9. FIG. 7 is a diagram illustrating a family of frequency bins 700 having predetermined carrier frequency offsets suitable for implementing the present frequency bin method of carrier frequency acquisition according to one embodiment of the

TABLE 1

Standard deviation of carrier frequency offset estimates obtained from the primary synchronization channel (PSC) with AWGN channel.

|  | −3 dB $E_b/N_o$ | −1 dB $E_b/N_o$ | 1 dB $E_b/N_o$ | 3 dB $E_b/N_o$ | 5 dB $E_b/N_o$ |
|---|---|---|---|---|---|
| Quarter symbol | 0.89 rad | 0.57 rad | 0.31 rad | 0.20 rad | 0.14 rad |
| Pull-in range = 30000 Hz | 4.56 ppm | 2.92 ppm | 1.57 ppm | 1.03 ppm | 0.70 ppm |
| 8 time slots = 5.3 ms | 9200 Hz | 5800 Hz | 3100 Hz | 2100 Hz | 1400 Hz |
| Half symbol | 0.82 rad | 0.61 rad | 0.38 rad | 0.29 rad | 0.21 rad |
| Pull-in range = 15000 Hz | 2.08 ppm | 1.54 ppm | 0.96 ppm | 0.74 ppm | 0.54 ppm |
| 8 time slots = 5.3 ms | 4200 Hz | 3100 Hz | 1900 Hz | 1500 Hz | 1100 Hz |
| Quarter symbol | 0.65 rad | 0.34 rad | 0.22 rad | 0.14 rad | 0.09 rad |
| Pull-in range = 30000 Hz | 3.32 ppm | 1.72 ppm | 1.10 ppm | 0.71 ppm | 0.47 ppm |
| 15 time slots = 10 ms | 6600 Hz | 3400 Hz | 2200 Hz | 1400 Hz | 930 Hz |
| Half symbol | 0.63 rad | 0.41 rad | 0.28 rad | 0.19 rad | 0.15 rad |
| Pull-in range = 15000 Hz | 1.60 ppm | 1.03 ppm | 0.71 ppm | 0.49 ppm | 0.38 ppm |
| 15 time slots = 10 ms | 3200 Hz | 2100 Hz | 1400 Hz | 980 Hz | 760 Hz |
| Quarter symbol | 0.24 rad | 0.15 rad | 0.10 rad | 0.07 rad | 0.05 rad |
| Pull-in range = 30000 Hz | 1.22 ppm | 0.75 ppm | 0.50 ppm | 0.35 ppm | 0.23 ppm |
| 60 time slots = 40 ms | 2400 Hz | 1500 Hz | 1000 Hz | 690 Hz | 460 Hz |
| Half symbol | 0.26 rad | 0.18 rad | 0.13 rad | 0.10 rad | 0.08 rad |
| Pull-in range = 15000 Hz | 0.67 ppm | 0.46 ppm | 0.34 ppm | 0.25 ppm | 0.19 ppm |
| 60 time slots = 40 ms | 1300 Hz | 920 Hz | 670 Hz | 500 Hz | 390 Hz |

In summary explanation of the above, one embodiment of the present joint position and carrier frequency estimation method of initial carrier frequency acquisition first implements both position and carrier frequency estimation techniques during stage 1 to find the location of the primary synchronization code that is associated with the position p of the path with the largest magnitude. Upon locating the primary synchronization code, the estimated carrier frequency offset is next corrected by either adjusting the voltage controlled oscillator (VCO) or multiplying the samples acquired at the mobile terminal or remote receiver by complex frequency correction factors. Stages 2 and 3 of the joint position and carrier frequency estimation method are next performed wherein 1) the secondary synchronization code that overlaps the primary synchronization channel that contains the primary synchronization channel symbols is decoded so that the mobile terminal or remote receiver will know which group of downlink codes the base station or transmitter uses and 2) the particular scrambling code used by the base station/transmitter is determined by correlation between a single scrambling code and the distinct pilot symbols contained within the received WCDMA communication signal transmitted by the base station/transmitter. As used herein, correlation means finding the scrambling code having highest energy level subsequent to decoding the pilot symbols via the scrambling code. Since present invention. The frequency range between +/−20 kHz is seen divided into 5 bins 702–710 centered at −16, −8, 0, 8 and 16 kHz, corresponding to −8, −4, 0, 4 and 8 ppm respectively.

Figure 8:
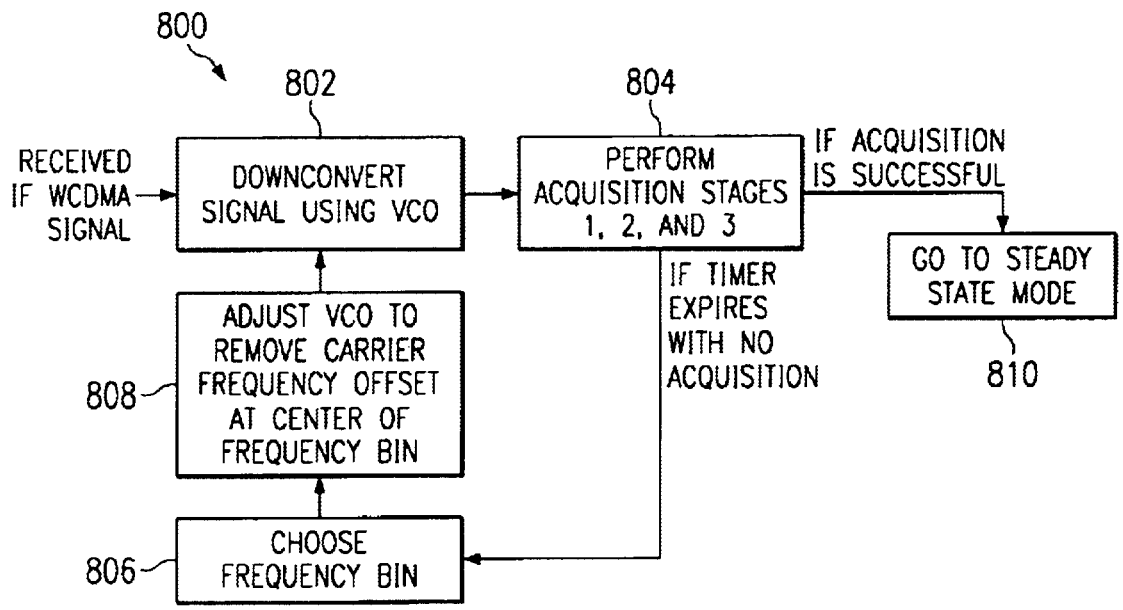
FIG. 8 is a block diagram illustrating a frequency bin method of achieving initial carrier frequency acquisition for a mobile terminal or remote receiver in a WCDMA communication system such as shown in FIG. 1 according to one embodiment of the present invention.

FIG. 8 is a block diagram illustrating a frequency bin method 800 of achieving initial carrier frequency acquisition for a mobile terminal or remote receiver in a WCDMA communication system such as shown in FIG. 1 according to one embodiment of the present invention. Before carrier frequency acquisition can commence, it is preferable to first downconvert a WCDMA communication signal using the local voltage controlled oscillator (VCO) as illustrated in block 802. Carrier frequency acquisition can then be implemented according to one embodiment of the present frequency bin method by first assuming that the carrier frequency offset is 0 Hz, corresponding to 0 ppm (Bin 3) 706. Thus, no VCO frequency adjustment is necessary to begin the frequency acquisition process. Stages 1–3 of initial carrier frequency acquisition, described in detail above in association with the joint position and carrier frequency estimation method, are next implemented as shown in block 804. This portion of the frequency bin method is repeated for a predetermined period of time that is controlled using either hardware or software techniques, or a combination of both. If the timer expires with no carrier frequency acquisition, as evidenced by lack of communication between a transmitter and a remote receiver, the method then moves to the next step of selecting a different frequency bin, e.g. 702, 704, 708, 710, and proceeding to adjust the VCO to remove the carrier frequency offset corresponding to the newly selected frequency bin as shown in blocks 806 and 808. After the frequency offset corresponding to the newly selected frequency bin has been removed via adjustment of the VCO, stages 1–3 of the carrier frequency acquisition process is again repeated for the same predetermined period of time set by the internal timer. If the carrier signal is acquired before the timer expires, the mobile terminal or remote receiver will enter its steady state communication mode as shown in block 810, and the carrier frequency acquisition process can be allowed to terminate. Since there are a total of 5 bins in the instant embodiment, the acquisition time will be about 5 times the steady state acquisition time. As stated herein before, the mobile terminal or remote receiver can store carrier frequency offset information from just before it was previously turned-off. In this way, the remote receiver can start the search process in the bin corresponding to the one stored in memory. One advantage of this technique is that if the temperature of the remote receiver has not changed much when it is again turned-on, it is likely that the frequency bin has not changed and carrier frequency acquisition can be achieved in the same time as needed for steady state conditions.

It is possible that the carrier frequency can sometimes successfully be acquired even though the residual frequency offset is larger than 2 ppm. In such cases, the sampling clock may have drifted by half a chip by the time carrier frequency acquisition is completed. Even in the case of steady state acquisition however, the same drift may be present. Thus, sampling points that are half a chip away from the on-time sampling point are preferably checked following initial carrier frequency acquisition. This sampling point check can be implemented after acquisition since the long code will be known, allowing use of the pilot symbols.

Both the joint position and carrier frequency estimation method and the frequency bin method of carrier frequency acquisition described herein can accommodate carrier frequency offsets up to about 10 ppm. The joint position and carrier frequency offset method requires about 3 times the computational complexity at stage 1 and 8 times the acquisition time as that required by steady state acquisition. In contrast thereof, the frequency bin method has the same level of complexity as that required by steady state acquisition. The acquisition time required by the frequency bin method is, however, about 5 times that required for steady state acquisition. Further, the frequency bin method requires no additional hardware since the bins 702–710 can be tested sequentially. Since the initial carrier frequency acquisition is necessary only at power-up, this factor of 5 increase in acquisition time is reasonable for present wireless communications. Regarding this aspect of the invention, the present inventors have determined the frequency bin method will require about 750 msec versus 150 msec in steady state for the worst case $E_b/N_o$ or −3 dB for the primary synchronization channel. Thus, the frequency bin method of carrier frequency acquisition is the more desirable method of the two foregoing methods where no hardware increase can be tolerated.

Figure 9:
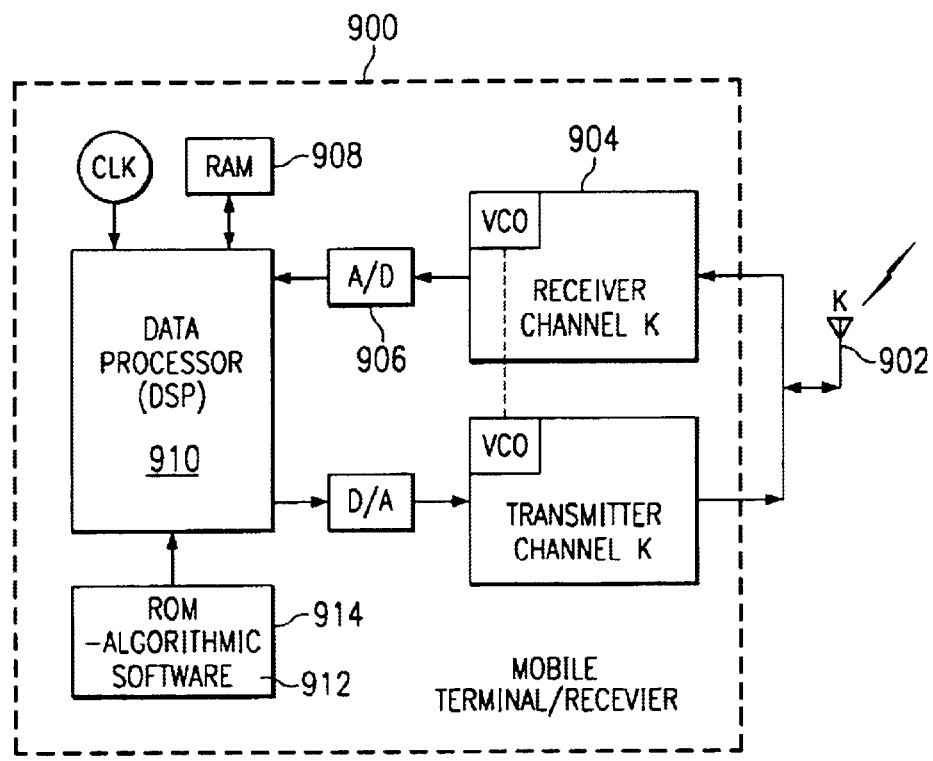
FIG. 9 is a simplified block diagram illustrating a mobile terminal/remote receiver configured to implement initial frequency acquisition according to one embodiment of the present invention.

FIG. 9 illustrates a mobile terminal/remote receiver 900 suitable for implementing the present methods according to one embodiment of the present invention. The WCDMA signal is received via antenna 902 and thereafter is sampled via local receiver 904 and its associated A/D 906. The sampled signal data is stored in a data storage device such as a RAM 908 where it can be accessed by a data processor 910 such as a DSP. The data processor 910 is directed by an algorithmic software 912, preferably stored within a non-volatile data storage device such as a ROM 914. The algorithmic software 912 directs the operation of the data processor 910 using algorithmically defined relationships associated with the WCDMA communication signal and described herein above, such that the carrier frequency of the base station or transmitter generating the WCDMA communication signal can be acquired by the mobile terminal or remote receiver 900 following turn-on of the mobile terminal/remote receiver 900.

This invention has been described in considerable detail in order to provide those skilled in the wireless communication art with the information need to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow. Although the present invention has been described in association with a particular set of symbol characteristics and a particular carrier frequency offset condition, for example, the present invention can accommodate initial frequency acquisition associated with many other symbol characteristics and related carrier frequency offset conditions. Those skilled in the art of wireless communication will appreciate that the principles of the invention described and claimed herein also apply to WCDMA time division duplex (TDD) signal communication; although the various embodiments described herein are exemplified using WCDMA frequency division duplex (FDD) signal characteristics. The present invention also applies to communication systems other than WCDMA communications wherever those other communication systems employ pilot symbols and the like. Further, the exemplary frequency acquisition methods of the present invention can be implemented in hardware or software, or a combination of both. In a preferred embodiment, the functions of a data communication system designed in conformance with the principals set forth herein are implemented as one or more integrated circuits using a suitable processing technology, e.g., CMOS, HBT.

As another example, at least portions of the present invention may be implemented in computer programs, i.e. algorithms, executing on programmable computers each comprising a data processor, a data storage system, including both volatile and non-volatile memory and/or data storage devices, at least one input device, and at least one output device. Program code is applied to input data to perform the functions described herein and generate output information. The output information is applied to one or more output devices, in known fashion. Each such program may be implemented in a high level procedural, or object oriented programming language to communicate with a computer system. However, the programs can be implemented in assembly or machine language, if desired. In any case, the language may be a compiled or interpreted language. Portions of the inventive structure and method may also be considered to be implemented as a computer-readable storage medium, configured with a computer program, where the storage medium so configured causes a data processor to operate in a specific and predefined manner to perform the functions described herein. An example of one such type of data processor is a digital signal processor (DSP).

What is claimed is:

1. A method of carrier frequency acquisition for a WCDMA communication signal, the method comprising the steps of:
   (a) establishing a plurality of carrier frequency offset bins, each bin within the plurality of bins having a uniquely distinct carrier frequency offset associated therewith;
   (b) selecting a single bin from the plurality of carrier frequency offset bins;
   (c) adjusting a voltage controlled oscillator to remove the uniquely distinct carrier frequency offset associated with the selected single bin;
   (d) locating a primary synchronization code contained within a received WCDMA communication signal via a receiver associated with the adjusted voltage controlled oscillator;
   (e) decoding a secondary synchronization code contained within the received WCDMA communication signal such that a code group comprising a set of scrambling codes associated with the received WCDMA communication signal can be determined, the secondary synchronization code overlapping a primary synchronization channel containing the primary synchronization code;
   (f) correlating the set of scrambling codes with distinct pilot symbols contained within the received WCDMA communication signal to determine a scrambling code being used by a transmitter generating the scrambling code; and
   (g) repeating steps (d)–(f) no longer than a predetermined maximum period of time to determine a valid scrambling code.

2. The method according to claim 1 further comprising the step of selecting a different single bin from the plurality of carrier frequency offset bins if a valid scrambling code has not been determined in step (g), wherein the different single bin is not associated with a most recently selected single bin, and repeating steps (c)–(g) following selection of the different single bin.

3. The method according to claim 2 further comprising the step of implementing a steady state operating mode associated with the receiver upon determination of the valid scrambling code.

4. The method according to claim 1 further comprising the step of implementing a steady state operating mode associated with the receiver upon determination of the valid scrambling code.

5. A method of carrier frequency acquisition for a WCDMA communication signal, the method comprising the steps of:
   (a) establishing a plurality of carrier frequency offset bins, each bin within the plurality of bins having a uniquely distinct carrier frequency offset associated therewith, wherein one bin within the plurality of bins comprises a 0 Hz carrier frequency offset;
   (b) selecting the bin comprising a 0 Hz carrier frequency offset;
   (c) locating a primary synchronization code contained within a received WCDMA communication signal via a receiver having a voltage controlled oscillator adjusted to remove the distinct carrier frequency offset associated with the selected bin;
   (d) decoding a secondary synchronization code contained within the received WCDMA communication signal such that a code group comprising a set of scrambling codes associated with the received WCDMA communication signal can be determined, the secondary synchronization code overlapping a primary synchronization channel containing the primary synchronization code;
   (e) correlating the set of scrambling codes with distinct pilot symbols contained within the received WCDMA communication signal to determine a scrambling code being used by a transmitter generating the scrambling code; and
   (f) repeating steps (c)–(e) no longer than a predetermined maximum period of time to determine a valid scrambling code.

6. The method according to claim 5 further comprising the step of selecting a different single bin from the plurality of carrier frequency offset bins if a valid scrambling code has not been determined in step (f), wherein the different single bin is not associated with a most recently selected single bin, and repeating steps (c)–(f) following selection of the different single bin.

7. The method according to claim 6 further comprising the step of implementing a steady state operating mode associated with the receiver upon determination of the valid scrambling code.

8. The method according to claim 5 further comprising the step of implementing a steady state operating mode associated with the receiver upon determination of the valid scrambling code.

9. A WCDMA communication system comprising:
   at least one receiver configured to receive a WCDMA signal transmitted from a WCDMA transmitter, the at least one receiver comprising:
   a data processor;
   a data input device in communication with the data processor;
   an algorithmic software directing the data processor; and
   a data storage unit, wherein discrete frequency bin data, discrete WCDMA radio frame data, discrete WCDMA time slot data, discrete WCDMA primary synchronization channel data, discrete WCDMA secondary synchronization channel data and discrete pilot symbol data is stored and supplied to the data processor such that the data processor, directed by the algorithmic software, can automatically determine valid scrambling code data associated with a transmitter generating a WCDMA communication signal, using algorithmically defined relationships associated with the discrete frequency bin data, discrete radio frame data, discrete time slot data, discrete primary synchronization channel data, discrete secondary synchronization channel data and discrete pilot symbol data.

10. The WCDMA communication system according to claim 9 further comprising an adjustable voltage controlled oscillator (VCO) in electrical communication with the data processor such that the data processor, directed by the algorithmic software, is capable of controlling adjustment of the VCO to remove a carrier frequency offset associated with a single frequency offset bin selected from a plurality of predetermined frequency offset bins.

11. A WCDMA communication system comprising:
   at least one receiver configured to receive a WCDMA signal transmitted from a WCDMA transmitter, the at least one receiver comprising:

a data processor;
a data in input device in communication with the data processor;
an algorithmic software directing the data processor;
a data storage unit, wherein discrete frequency bin data, discrete WCDMA radio frame data, discrete WCDMA time slot data, discrete WCDMA primary synchronization channel data, discrete WCDMA secondary synchronization channel data and discrete pilot symbol data is stored and supplied to the data processor such that the data processor, directed by the algorithmic software, can automatically determine valid scrambling code data associated with a transmitter generating a WCDMA communication signal, using algorithmically defined relationships associated with the discrete frequency bin data, discrete radio frame data, discrete time slot data, discrete primary synchronization channel data, discrete secondary synchronization channel data and discrete pilot symbol data; and
a timer configured to stop correlating the set of scrambling codes with distinct pilot symbols after a predetermined period of time has elapsed.

12. The WCDMA communication system according to claim 11 wherein the timer is a hardware device.

13. The WCDMA communication system according to claim 11 wherein the timer comprises a portion of the algorithmic software.

14. The WCDMA communication system according to claim 9 wherein the algorithmic software is configured to select a single carrier frequency offset bin from a plurality of predetermined carrier frequency offset bins after the predetermined period of time has elapsed, wherein the selected single carrier frequency offset bin is not associated with a most recently selected single carrier frequency offset bin.

15. A method of carrier frequency acquisition for a WCDMA communication signal, the method comprising the steps of:
  (a) locating a primary synchronization code contained within a received WCDMA communication signal via a receiver having a voltage controlled oscillator (VCO) adjusted to remove a distinct carrier frequency offset selected from among a plurality of predetermined carrier frequency offsets;
  (b) decoding a secondary synchronization code contained within the received WCDMA communication signal such that a code group comprising a set of scrambling codes associated with the received WCDMA communication signal can be determined, the secondary synchronization code overlapping a primary synchronization channel containing the primary synchronization code;
  (c) correlating the set of scrambling codes with distinct pilot symbols contained within the received WCDMA communication signal to determine a scrambling code being used by a transmitter generating the scrambling code; and
  (d) repeating steps (a)–(c) if a valid scrambling code cannot be determined within a predetermined maximum period of time.

16. The-method according to claim 15 further comprising the step of establishing a plurality of carrier frequency offset bins, each carrier frequency offset bin within the plurality of carrier frequency offset bins having a uniquely distinct carrier frequency offset associated therewith to establish the plurality of predetermined carrier frequency offsets.

17. A method of carrier frequency acquisition for a WCDMA communication signal, the method comprising the steps of:
  (a) establishing a plurality of carrier frequency offset bins, each carrier frequency offset bin within the plurality of carrier frequency offset bins having a uniquely distinct carrier frequency offset associated therewith to establish the plurality of predetermined carrier frequency offsets;
  (b) locating a primary synchronization code contained within a received WCDMA communication signal via a receiver having a voltage controlled oscillator (VCO) adjusted to remove a distinct carrier frequency offset selected- from among a plurality of predetermined carrier frequency offsets;
  (c) decoding a secondary synchronization code contained within the received WCDMA communication signal such that a code group comprising a set of scrambling codes associated with the received WCDMA communication signal can be determined, the secondary synchronization code overlapping a primary synchronization channel containing the primary synchronization code;
  (d) correlating the set of scrambling codes with distinct pilot symbols contained within the received WCDMA communication signal to determine a scrambling code being used by a transmitter generating the scrambling code;
  (e) repeating steps (b)–(d) if a valid scrambling code cannot be determined within a predetermined maximum period of time; and
  (f) wherein the step of locating a primary synchronization code in step (b) is initiated by selecting a carrier frequency offset bin comprising a 0 Hz carrier frequency offset such that the VCO need not be adjusted before initially commencing steps (c)–(e) a first time.

18. A method of carrier frequency acquisition for a WCDMA communication signals the method comprising the steps of:
  (a) configuring a plurality of carrier frequency offset bins such that a plurality of predetermined carrier frequency offsets are sufficient in combination to substantially eliminate temperature dependent frequency errors associated with a voltage controlled oscillator (VCO), each carrier frequency offset bin within the plurality of carrier frequency offset bins having a uniquely distinct carrier frequency offset associated therewith to establish the plurality of predetermined carrier frequency offsets;
  (b) locating a primary synchronization code contained within a received WCDMA communication signal via a receiver having said VCO adjusted to remove a distinct carrier frequency offset selected from among a plurality of predetermined carrier frequency offsets;
  (c) decoding a secondary synchronization code contained within the received WCDMA communication signal such that a code group comprising a set of scrambling codes associated with the received WCDMA communication signal can be determined, the secondary synchronization code overlapping a primary synchronization channel containing the primary synchronization code;
  (d) correlating the set of scrambling codes with distinct pilot symbols contained within the received WCDMA communication signal to determine a scrambling code being used by a transmitter generating the scrambling code; and
  (e) repeating steps (b)–(d) if a valid scrambling code cannot be determined within a predetermined maximum period of time.

19. A method of carrier frequency acquisition for a WCDMA communication signal, the method comprising the steps of:
(a) locating a primary synchronization code contained within a received WCDMA communication signal via a receiver having a voltage controlled oscillator (VCO) adjusted to remove a distinct carrier frequency offset selected from among a plurality of predetermined carrier frequency offsets;
(b) decoding a secondary synchronization code contained within the received WCDMA communication signal such that a code group comprising a set of scrambling codes associated with the received WCDMA communication signal can be determined, the secondary synchronization code overlapping a primary synchronization channel containing the primary synchronization code;
(c) correlating the set of scrambling codes with distinct pilot symbols contained within the received WCDMA communication signal to determine a scrambling code being used by a transmitter generating the scrambling code;
(d) implementing a steady state operating mode associated with a receiver receiving the WCDMA communication signal upon determination of the valid scrambling code; and
(e) repeating steps (a)–(d) if a valid scrambling code cannot be determined within a predetermined maximum period of time.

20. A method of carrier frequency acquisition for a communication signal, the method comprising the steps of:
(a) performing a carrier frequency offset correction within a communications receiver to remove a first predetermined carrier frequency offset;
(b) performing synchronization procedures within a communications receiver to synchronize communications between a transmitter and a receiver performing the carrier frequency offset correction of step (a); and
(c) repeating steps (a) and (b) using a newly predetermined carrier frequency offset if synchronization is not completed within a maximum period of time, wherein the newly predetermined carrier frequency offset is not associated with a most recently predetermined carrier frequency offset.

21. The method according to claim 20 wherein the step (a) of performing a carrier frequency offset correction comprises performing a carrier frequency offset correction associated with a WCDMA communications signal.

22. The method according to claim 20 wherein the step (a) of performing a carrier frequency offset correction comprises performing a carrier frequency offset correction associated with a communications signal having pilot symbols.

23. The method according to claim 20 wherein the step (b) of performing synchronization procedures comprises adjusting a voltage controlled oscillator (VCO) to remove a most recently predetermined carrier frequency offset.

24. A method of carrier frequency acquisition for a communication signal, the method comprising the steps of:
(a) performing a carrier frequency offset correction within a communications receiver to remove a first predetermined carrier frequency offset;
(b) performing synchronization procedures within a communications receiver, comprising multiplying a communications signal by complex frequency correction factors to remove a most recently predetermined carrier frequency offset, to synchronize communications between a transmitter and a receiver performing the carrier frequency offset correction of step (a); and
(c) repeating steps (a) and (b) using a newly predetermined carrier frequency offset if synchronization is not completed within a maximum period of time, wherein the newly predetermined carrier frequency offset is not associated with a most recently predetermined carrier frequency offset.

* * * * *